(12) United States Patent
Doit et al.

(10) Patent No.: US 6,283,641 B1
(45) Date of Patent: Sep. 4, 2001

(54) HERMAPHRODITE OPTICAL CONNECTOR

(75) Inventors: Stéphane Doit, Chamonix; Philippe Pouyez, Argenteuil; Pierre-Henri Kayoun, Boulogne-Billancourt, all of (FR)

(73) Assignee: Amphenol Socapex (FR)

( * ) Notice: Subject to any disclaimer, the term of this patent is extended or adjusted under 35 U.S.C. 154(b) by 0 days.

(21) Appl. No.: 09/452,468

(22) Filed: Dec. 2, 1999

(30) Foreign Application Priority Data

Dec. 3, 1998 (FR) .................................................. 98 15269

(51) Int. Cl.⁷ ...................................................... G02B 6/38
(52) U.S. Cl. ................................................. 385/59; 385/71
(58) Field of Search ................................. 385/59, 71, 65, 385/66, 83

(56) References Cited

U.S. PATENT DOCUMENTS

| | | | |
|---|---|---|---|
| 4,458,985 | * 7/1984 | Balliet | 385/65 |
| 4,634,202 | * 1/1987 | Taylor | 350/96.2 |
| 5,600,748 | * 2/1997 | Kosaka | 385/59 |
| 5,845,028 | * 12/1998 | Smith | 385/59 |
| 6,030,244 | * 2/2000 | Buckheit | 439/291 |

FOREIGN PATENT DOCUMENTS

| | | | |
|---|---|---|---|
| 0114230A1 | * 8/1984 | (EP) . | |
| 0 121 610 | 10/1984 | (EP) | G02B/7/26 |
| 0547777A1 | * 6/1993 | (EP) . | |
| 0679916A1 | * 11/1995 | (EP) . | |
| 0 679 916 | 11/1995 | (EP) | G02B/6/38 |
| 1 575 882 | 10/1980 | (GB) | G02B/7/26 |

* cited by examiner

Primary Examiner—Cassandra Spyrou
Assistant Examiner—Leo Boutsikaris
(74) Attorney, Agent, or Firm—Blank Rome Comisky & McCauley, LLP

(57) ABSTRACT

The invention relates to a hermaphrodite optical connector having two identical connector elements, each connector element comprising a housing (14) provided with a connection face (12) having optical conductor terminations (18) which occupy positions in the connection face that are symmetrical about a hermaphrodite axis contained in the connection face, and means for mechanical connection and positioning of the two connector elements, which means comprise n holes (24, 26, 28) formed in the connection face and n studs (20, 22, 30) projecting therefrom, a hole of one connector element being suitable for receiving the associated stud of the other connector element, and n being greater than one. Each connection hole (24, 26, 28) of a connector element is symmetrical with a connection stud (20, 22, 30) of the same connector element about the hermaphrodite axis (X–X').

9 Claims, 3 Drawing Sheets

HERMAPHRODITE OPTICAL CONNECTOR

The present invention relates to an optical connector of the hermaphrodite type.

More precisely, the present invention relates to an optical connector in which the two optical connector elements conventionally referred to as the "male" element and as the "female" element are both of exactly the same structure, in particular with respect to the interconnection portions between the first connector element and the second connector element.

BACKGROUND OF THE INVENTION

With optical connectors, each connector element has a coupling face which includes the terminations of optical conductors, e.g. optical fibers, of a cable which is coupled to the connector element. The optical terminations which can also consist in respective optical systems associated with each optical fiber, they are disposed in the connection face, and they are accurately positioned relative to the body of the connector. To make a connection, it is naturally necessary to position the two connector elements accurately relative to each other in such a manner as to end up with accurate positioning of the optical terminations themselves.

The optical terminations are present in exactly the same manner in each of the two connector elements, so it is advantageous to provide means for mechanically linking and positioning the two connector elements relative to each other that are of the hermaphrodite type, i.e., as already mentioned, of the type in which both connector elements, and in particular their mechanical coupling elements, are completely identical. It will be understood that it is possible in this way to reduce costs since then all of the connector elements mounted at the ends of cables can be identical.

OBJECTS AND SUMMARY OF THE INVENTION

An object of the present invention is to provide an optical connector element of the hermaphrodite type, i.e. in which the connector is constituted by two connector elements that are completely identical, in particular concerning the members for mechanical coupling and positioning.

To achieve this object, the invention provides a hermaphrodite optical connector comprising two identical connector elements, each connector element comprising a housing having a connection face with optical conductor terminations, said terminations occupying positions in said connection face that are symmetrical about a hermaphrodite axis contained in said face, and means for positioning and mechanically connecting the two connector elements comprising n holes formed in said face and n studs projecting from said face, a hole in one connector element being suitable for receiving the associated stud of the other connector element. The connector is characterized in that:

n is not less than three; and each connection hole of one connector element is symmetrical with a connection pin of the same connector element about said hermaphrodite axis.

It will be understood that because of the symmetrical positioning about the hermaphrodite axis between a connection stud and a connection hole, a structure is obtained that is indeed identical for both elements forming the optical connector. In addition, the presence of at least three connection studs ensures that positioning is accurate and that the linking is effective.

In a preferred embodiment, each connection stud of a connector element is substantially tangential to a connection hole of said connector element.

This embodiment is particularly advantageous when the bodies of the connector elements are made by molding. Because they are tangential, it is possible to use mold cores of larger size, making it possible simultaneously to make the hole and the orifice serving for insertion of the connection stud.

Preferably, each connection stud has a locking groove at a predetermined distance from the connection face of the connector element to which it belongs, and each connector element has an annular slot in its housing communicating with the connection holes, said connector element also having a resilient annular locking ring mounted in said slot, said ring being suitable for penetrating in a portion of the groove in each connection stud of the other connector element when the two connector elements are coupled together. This method of locking enables the connection faces of the two connector elements to be pressed against each other with sufficient force.

BRIEF DESCRIPTION OF THE DRAWINGS

Other characteristics and advantages of the invention will appear more clearly on reading the following description of various embodiments of the invention given as non-limiting examples. The description refers to the accompanying figures, in which.

MORE DETAILED DESCRIPTION

Figure 1:
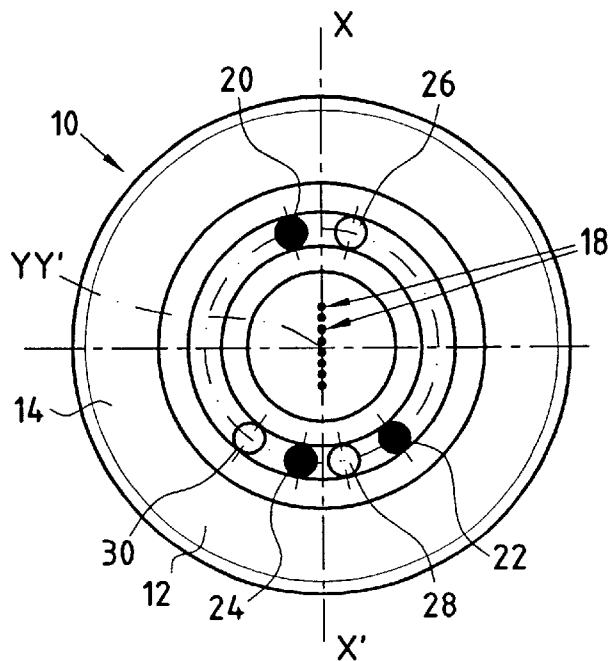
FIG. 1 is a front view showing the principle on which the connection studs and the connection holes are positioned in the connection face of the connector element.

With reference initially to FIG. 1, there follows a description of a first embodiment of a connector element of a hermaphrodite optical connector. In FIG. 1, there can be seen the connection face 12 of the substantially cylindrical body 14 of a connector element 10. The body 14 of the connector element has a longitudinal axis of revolution Y–Y'. In the face 12, there can be seen the optical terminations 18 of the cable connected to the connector element 10. In this embodiment, the optical terminations 18 are eight in number and they are in alignment in said face on a straight line or "hermaphrodite axis" X–X' which corresponds to a longitudinal diametral plane of the body 14.

In this embodiment, to ensure that the two connector elements are positioned relative to each other and mechanically linked together, three connection studs 20, is 22, and 24 are used together with three connection holes 26, 28, and 30. Each connection hole of the element 10 can receive a connection stud of the second connector element, and symmetrically each connection stud of the element 10 can penetrate into a connection hole of the second connector element. In this embodiment, in order to obtain a connector element that is of hermaphrodite nature, each connection stud 20, 22, and 24 is symmetrical to a corresponding one of the connection holes 26, 28, and 30 about the hermaphrodite axis X–X'. In the figure, the hole 26 is symmetrical to the stud 20, the hole 30 is symmetrical to the stud 22, and the hole 28 is symmetrical to the stud 24. The connection studs and holes of the second connector element occupy exactly the same positions. Naturally the number of connection holes and studs could be other than three.

It will thus be understood that it is possible to obtain two connector elements that are strictly identical and that are suitable for co-operating with each other.

Figure 5:
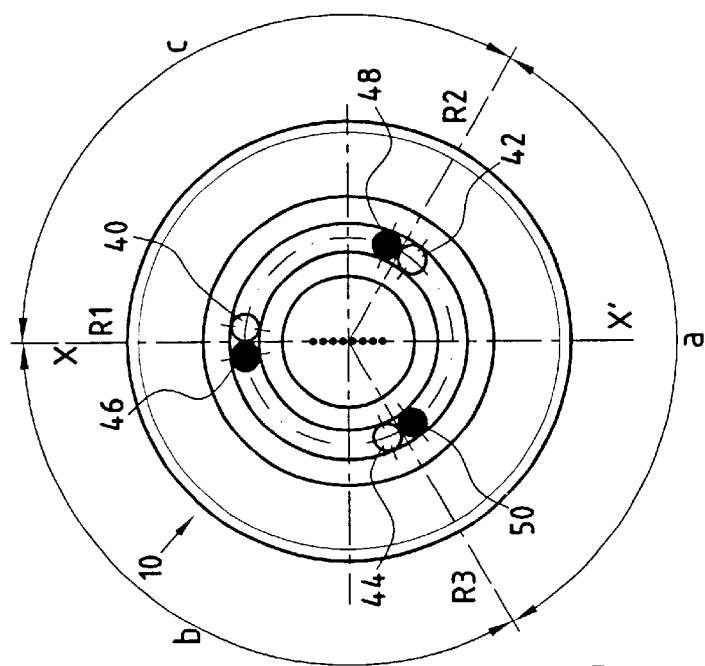
FIG. 5 shows a variant of the FIG. 2 embodiment.
Figure 4:
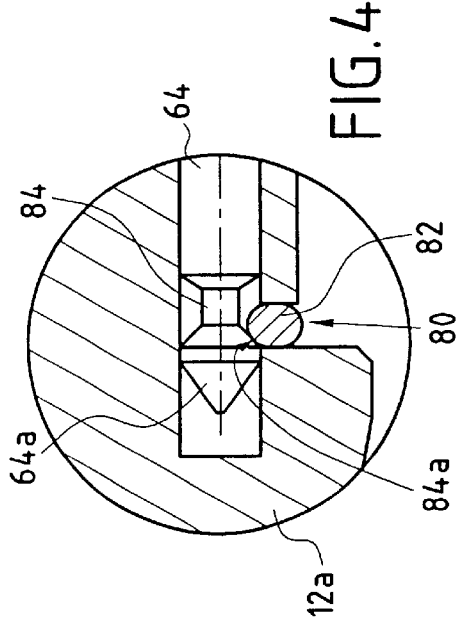
FIG. 4 is a detail view of FIG. 3 showing how two connector elements are linked together.

FIG. 5 shows a preferred configuration for positioning the connection studs and the connection holes. The connection holes are now referenced 40, 42, and 44 while the connection studs are referenced 46, 48, and 50. Each connection stud is tangential to a connection hole, and each pair comprising a connection hole and a connection stud is tangential to a respective radius R1, R2, or R3 of the connection face, which radii are at angles a, b, and c to one another that are all equal to 120 degrees.

Figure 2:
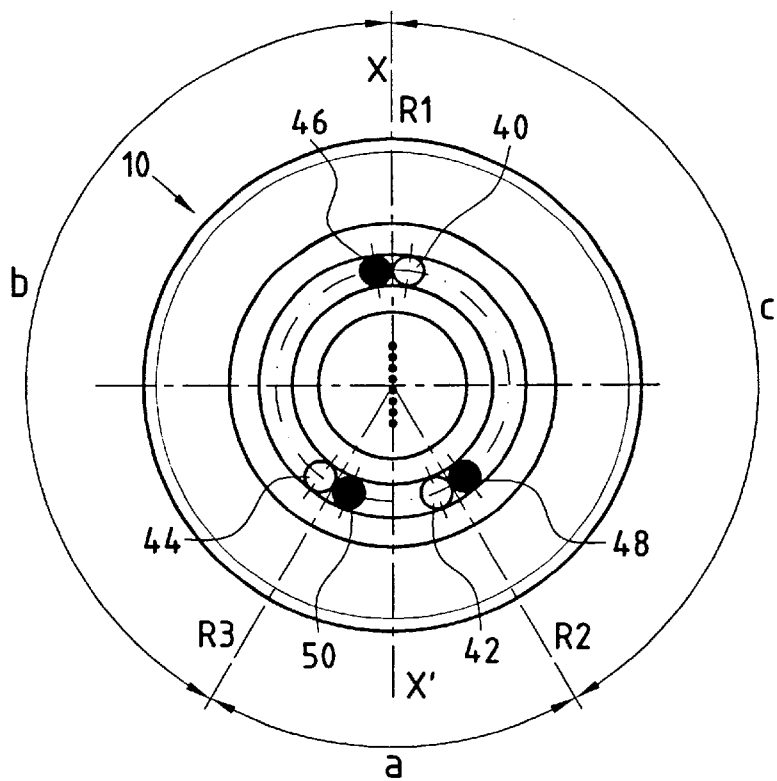
FIG. 2 is a front view showing a preferred embodiment of the connector element.

In this disposition, the symmetrical configuration about the hermaphrodite axis X–X' is indeed retained. In addition, the fact that a stud is tangential with a hole, i.e. that a connection hole is tangential with the hole that is going to receive the stud, makes it possible during manufacture of the body of the connector element by molding to use a single mold core for making both the connection hole and the fixing hole for the connection stud. Manufacture of the body in the embodiment of FIG. 5 is fully circularly symmetrical at 120°. To avoid relative positioning errors between two connector elements it is possible, for example, to provide for the angle between the radii R2 and R3 to be different from the angles b and c between the radii R1 and R3, and between the radii R1 and R2, which angles must be equal to each other. This is shown in FIG. 2. It is also possible, for example, to provide for the connection hole 40 and the connection stud 46 to be of diameters that are different from the diameters of other connection studs and holes.

Figure 3:
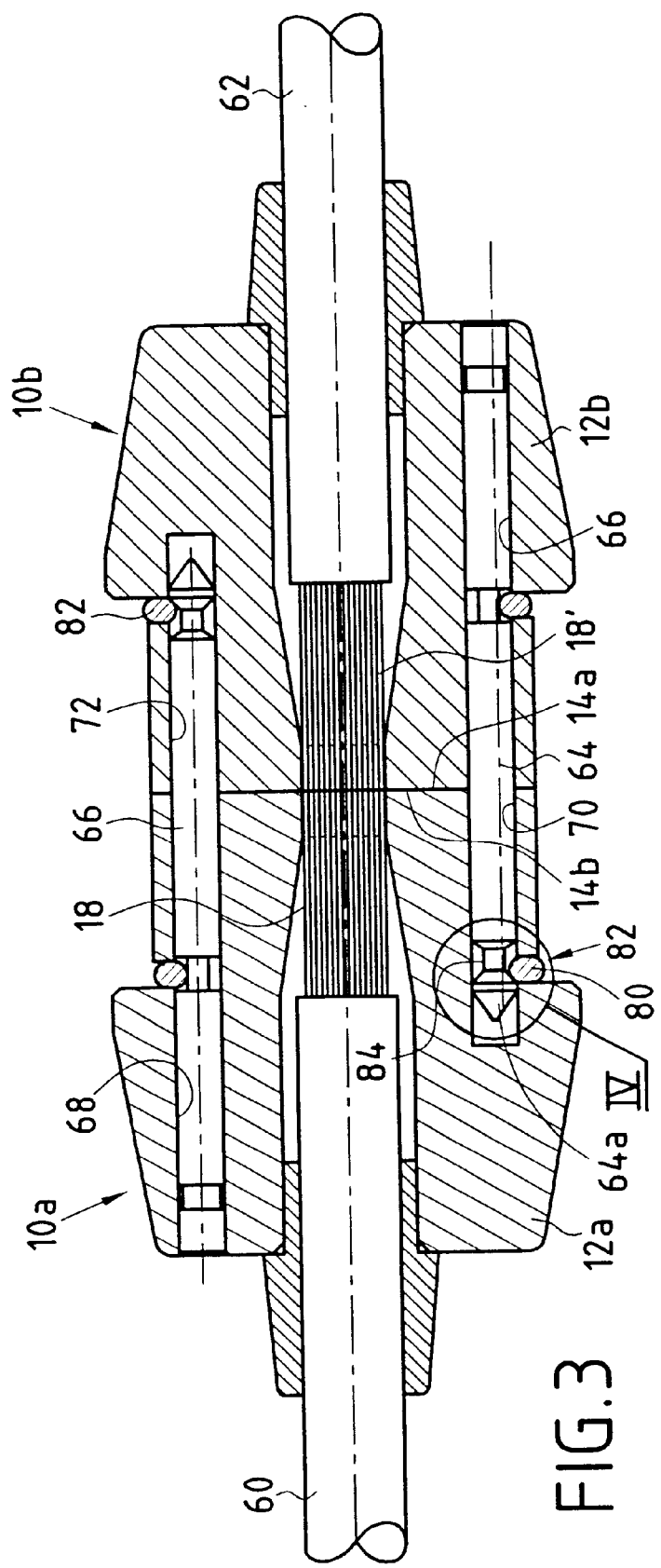
FIG. 3 is a longitudinal section view through a hermaphrodite connector element.

With reference now to FIG. 3, a complete embodiment of the connector is described in greater detail. It is constituted by two connector elements 10a and 10b which are identical as already explained.

In this figure, there can be seen the bodies 12b and 12a of the connector elements and also their connection faces 14a and 14b. In this figure, there can also be seen the optical cable 60 secured to the connector element 10a with its optical fibers 18 whose terminations lie in the connection plane 14a, and the optical cable 62 which is secured to the connector element 10b and whose optical fibers 18' have their terminations disposed in the connection face 14b.

This figure also shows a connection and centering stud, e.g. 64 fixed in the bore 66 of the body 12b of the connector element 10b and the centering stud 66 fixed in the bore 68 of the body 12a of the connector element 10a. There can also be seen the connection hole 70 of the connector element 10a and the connection hole 72 of the connector element 10b. To provide mechanical linking between the connector elements 10a and 10b, the periphery of the body of the connector element is provided with an annular slot 80 which communicates with the connection holes, e.g. 70, and also with the fixing holes e.g. 68 for fixing the connection studs. A resilient fixing ring 82 is mounted in the slot 80 and projects in particular into the connection holes such as 70. As can be seen in FIG. 3, the end 64a of the connection stud 64 is provided with a groove 84 which has a frustoconical bearing circuit 84a directed towards the end 64a. It will be understood that by the action of the resilient fixing ring 82 on the frustoconical bearing surface 84a of the connection stud, a clamping force effect is obtained which tends to press the connection faces 14a and 14b of the two connector elements against each other.

In the above description, it has been assumed that the optical terminations 18 are disposed on the hermaphrodite axis X–X'. It will be understood that it would not go beyond the invention if, more generally, the optical terminations were to occupy positions that were merely symmetrical overall about the axis X–X'.

Naturally, it would also be possible to provide some number of connection studs and holes that is greater than three. Under such circumstances, it is necessary for the holes and studs of each connector element to comply with the conditions of symmetry specified above. When four or more connection holes and studs are used, keying can be obtained by providing for the polygon which interconnects the axes of the holes or studs to have at least one side of length that is different from the length of the other sides.

What is claimed is:

1. A hermaphrodite optical connector comprising two identical connector elements, each connector element comprising:

a housing provided with a connection face;

optical conductor terminations, said terminations occupying in said connection face positions which are symmetrical about a hermaphrodite axis contained in said face; and means for mechanically connecting and positioning the two connector elements, said means comprising n holes formed in said face and n studs projecting from said face, a hole in one connector element being suitable for receiving the associated stud of the other connector element, n being not less than three;

and each connection hole of a connector element being symmetrical to a connection stud of the same connector element about said hermaphrodite axis.

2. An optical connector according to claim 1, in which each connection stud has a locking groove at a predetermined distance from the connection face of the connector element to which it belongs, and each connector element has an annular slot in its housing communicating with the connection holes, said connector element also having a resilient annular locking ring mounted in said slot, said ring being suitable for penetrating in a portion of the groove in each connection stud of the other connector element when the two connector elements are coupled together.

3. An optical connector according to claim 2, in which each connection stud groove has a frustoconical portion suitable for co-operating with said annular ring to exert a retaining force tending to press the plane connection faces against each other.

4. An optical connector according to claim 1, in which each connection stud of a connector element is substantially tangential to a connection hole of said connector element.

5. A connector according to claim 1, in which the connection studs and holes are cylindrical.

6. A connector according to claim 1, in which, for each connector element, at least one connection hole and the connection stud which is symmetrical thereto present a right cross-section of dimensions greater than the dimensions of the right cross-section of the other connection holes and studs.

7. An optical connector according to claim 1, in which the polygon interconnecting the connection studs and holes of a given connector element have at least one side of length different from the length of the other sides.

8. An optical connector according to claim 1, in which said optical conductor terminations are disposed on said hermaphrodite axis.

9. An optical connector according to claim 2, in which each connection stud of a connector element is substantially tangential to a connection hole of said connector element.

* * * * *